(12) United States Patent
Wieck

(10) Patent No.: US 8,572,864 B2
(45) Date of Patent: Nov. 5, 2013

(54) HYGIENIC DEHUMIDIFICATION OF ANIMAL CARCASSES WARM FROM SLAUGHTER

(75) Inventors: Richard Wieck, Rietberg (DE); Heidrun Gräfe, legal representative, Rietberg (DE)

(73) Assignee: Promethon AG, Rotkreuz (CH)

( * ) Notice: Subject to any disclaimer, the term of this patent is extended or adjusted under 35 U.S.C. 154(b) by 353 days.

(21) Appl. No.: 12/673,523

(22) PCT Filed: Aug. 14, 2008

(86) PCT No.: PCT/EP2008/060669
§ 371 (c)(1),
(2), (4) Date: Sep. 17, 2011

(87) PCT Pub. No.: WO2009/021983
PCT Pub. Date: Feb. 19, 2009

(65) Prior Publication Data
US 2012/0090194 A1 Apr. 19, 2012

(30) Foreign Application Priority Data

Aug. 16, 2007 (DE) .......................... 10 2007 038 815

(51) Int. Cl.
*F26B 3/02* (2006.01)

(52) U.S. Cl.
USPC .......... 34/381; 34/474; 34/500; 34/79; 34/90; 452/198; 62/373

(58) Field of Classification Search
USPC ............... 34/381, 413, 497, 474, 500, 79, 90, 34/557; 452/198, 179; 29/428; 261/116; 69/32, 42; 119/667, 669; 62/62, 373
See application file for complete search history.

(56) References Cited

U.S. PATENT DOCUMENTS

| | | | | | |
|---|---|---|---|---|---|
| 1,828,877 | A | * | 10/1931 | Elmer | 34/84 |
| 2,100,838 | A | * | 11/1937 | De Vout | 34/223 |
| 3,129,072 | A | * | 4/1964 | Cook et al. | 34/565 |
| 3,769,807 | A | | 11/1973 | Foster | |
| 3,991,480 | A | * | 11/1976 | Menge | 34/371 |

(Continued)

FOREIGN PATENT DOCUMENTS

| | | |
|---|---|---|
| CA | 1 335 342 C | 4/1995 |
| DE | 155 031 B | 5/1982 |

(Continued)

*Primary Examiner* — Steve M Gravin
(74) *Attorney, Agent, or Firm* — Gudrun E. Huckett

(57) ABSTRACT

The invention relates to a method and a device for handling carcasses of slaughtered animals during suspended transport after evisceration and before weighing in an abattoir by means of an air stream, in which a horizontally directed stream of conditioned air is made to flow around the carcasses at speeds of 1.5 to 6 m/s with a suction effect. Suspension conveyors are set up in a separate room in a meandering arrangement along parallel tracks transversely to the horizontally aligned extraction openings and inlet openings for air, and the inlet openings and extraction openings are connected through an air-conditioning plant, arranged outside the room, for dehumidifying and cooling the air extracted from the room. When a room designed as a dripping zone in an abattoir is used for the purposes according to the invention, the room is prepared by installing or fitting inlet openings and extraction openings on two enclosing walls lying opposite one another and is connected to a separate air-conditioning plant for conditioning the air.

20 Claims, 1 Drawing Sheet

(56) References Cited

U.S. PATENT DOCUMENTS

| | | | |
|---|---|---|---|
| 4,280,345 A * | 7/1981 | Gimelfarb et al. | 69/32 |
| 5,015,213 A * | 5/1991 | Hazenbroek | 452/149 |
| 5,144,754 A * | 9/1992 | Persson | 34/491 |
| 5,167,568 A * | 12/1992 | Esbroeck et al. | 452/116 |
| 5,179,789 A * | 1/1993 | Stroud et al. | 34/491 |
| 5,758,603 A * | 6/1998 | Vivier | 119/669 |
| 6,029,610 A * | 2/2000 | Ramsey et al. | 119/651 |
| 6,145,219 A * | 11/2000 | Van Dijck et al. | 34/476 |
| 7,856,842 B2 * | 12/2010 | Van Stuyvenberg | 62/374 |
| 8,176,652 B2 * | 5/2012 | Donahue et al. | 34/399 |
| 2003/0046827 A1 * | 3/2003 | Leber | 34/280 |
| 2005/0155247 A1 * | 7/2005 | Yarem et al. | 34/384 |
| 2010/0281708 A1 * | 11/2010 | Donahue et al. | 34/353 |
| 2011/0035956 A1 * | 2/2011 | Morris-Watson et al. | 34/287 |
| 2012/0090194 A1 * | 4/2012 | Wieck et al. | 34/474 |
| 2013/0081302 A1 * | 4/2013 | Morrison et al. | 34/499 |

FOREIGN PATENT DOCUMENTS

| | | |
|---|---|---|
| DE | 232 641 A1 | 5/1986 |
| DE | 38 40 782 A1 | 7/1989 |
| DE | 8903228 U1 | 7/1989 |
| EP | 0679335 B1 | 11/1995 |
| GB | 2 356 792 A | 6/2001 |

* cited by examiner

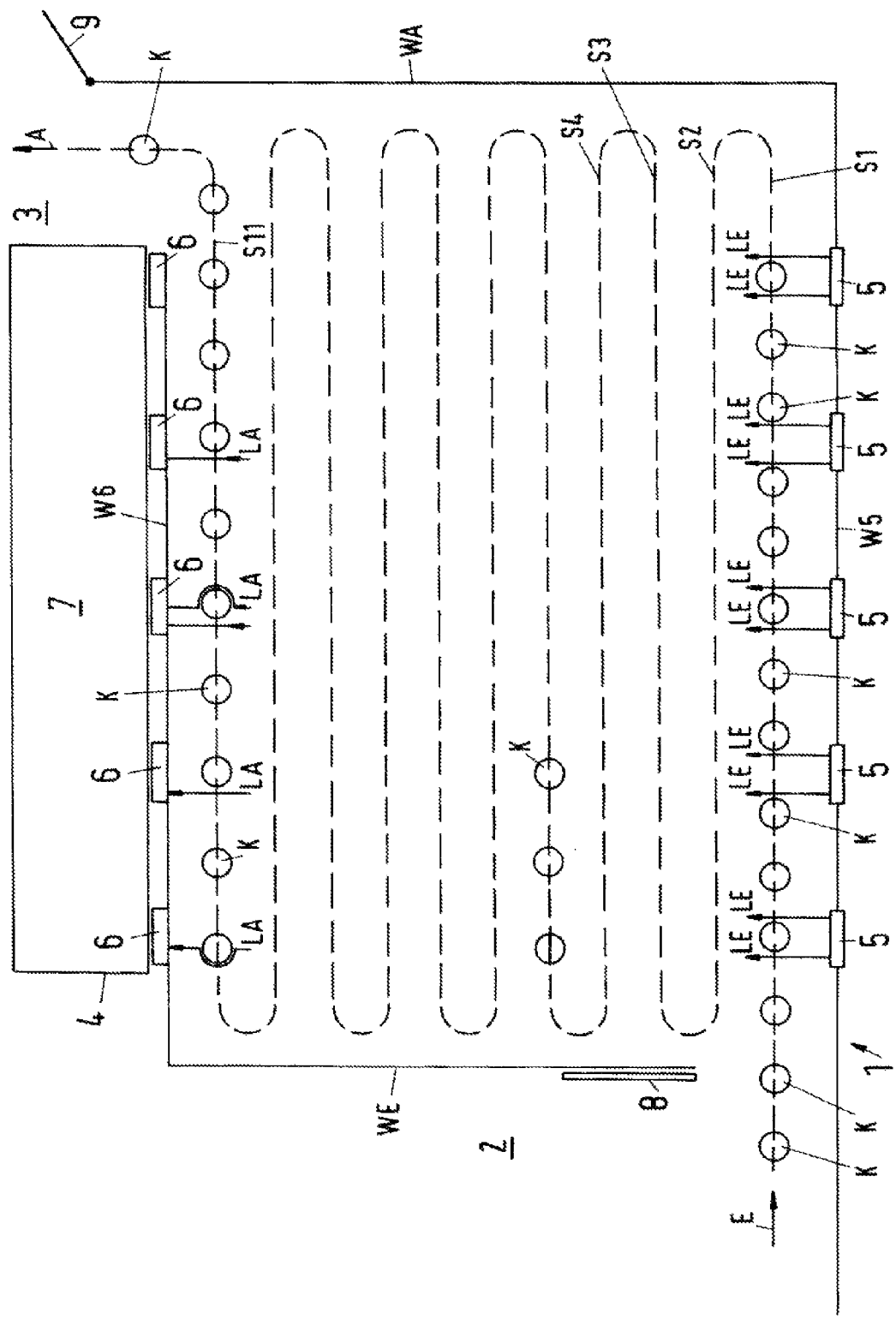

HYGIENIC DEHUMIDIFICATION OF ANIMAL CARCASSES WARM FROM SLAUGHTER

BACKGROUND OF THE INVENTION

The invention concerns a method and a device for treating by means of an air flow carcasses of slaughtered animals during suspended transport in a slaughterhouse after evisceration and prior to weighing.

In a typical slaughtering process, after stunning, the body of the animals is suspended from a hook passed through the hind legs in a clean area. In this way, the body is transported by means of a conveying system at the ceiling (suspension tracks) through the remaining slaughtering process. During the clean evisceration process, the chest part is split and the viscera removed. The individual separated internal organs accompany the carcass in parallel to the veterinary services where they are examined. Parts that exhibit any signs of a disease are sorted out. Subsequently, the carcass is cut in half at the backbone and chest. The carcass is weighed in order to determine the actual slaughter weight (carcass without blood and viscera) and is then transported into the cooling areas. Directly after slaughter, the normal temperature of the carcass is approximately 37° C. to 40° C. and must be cooled within 24 hours to 7° C.

Cooling is required in order to inhibit growth of bacteria. The carcass is cooled in that, for example, cool air (−20° C. to −30° C.) is blown at it. The surface cools down but in the interior the carcass is still warm. Subsequently, transport into a cooling area takes place in which the environmental temperature is maintained at 5° C. Here, the carcass is stored until the next day so that the inner temperature reaches the required value.

It is conventional to clean the slaughtered animals in an art-specific way. The carcasses of the slaughtered animals must be cleaned during the technological slaughtering process for reasons of hygiene. This technological cleaning process is matched to the specifics of the animal body to be slaughtered. This can be, for example, a simple wet cleaning after skinning, scalding or steaming with subsequent dehairing or bristle removal or feather removal from the animal body. Subsequently, the animals are eviscerated and pass a dripping stretch before being weighed.

The publication DD-B 155 031 discloses a method for lowering the losses of warm mass of slaughtered animal carcasses, in particular of cattle parts, in which the carcass parts of the slaughtered animal, immediately after wet cleaning but prior to weighing, are showered with air of ambient temperature to obtain a dry surface in order to then be chilled.

For carrying out the method, a device is to be used comprising a compartment for carcass parts of slaughtered animals transported in suspension that comprises several jet-like blow openings for air that are directed at a slant toward the bottom and intake channels for one or several axial fans, arranged in a closed air circulation system.

The system has several disadvantages. One reason is apparently that the inventors apparently calculated the price of energy higher than the raw material price of meat. Therefore, the goal is energy reduction. However, considering energy reduction does not take into account that in this way a loss of mass of surface-dry carcasses of slaughtered animals results during cooling.

In the described method, not less but more TBW/ECW/ICW (total body water/extracellular water/intracellular water) escapes so that the balance of the invention is disadvantageous with respect to economics.

Still more important are the hygienic and the thus resulting technical problems with the prior art. On the one hand, the minimal time period in which the animal bodies are passed continuously through the described compartment does not result in a sufficient drying action and, on the other hand, it is hygienically disadvantageous to employ untreated air in a closed circuit by blowing in again the saturated moist air that has been removed from the compartment.

EP 0679335 B1 discloses a cleaning device for slaughtered animal carcasses comprising devices for supply of cleaning liquid that is under pressure; a vacuum source; a vacuum nozzle device; a slaughtered animal carcass cleaning head that can be used and positioned by hand wherein the slaughtered animal carcass cleaning head can be placed onto a surface of the slaughtered animal carcass below a contamination located thereon, the slaughtered animal carcass cleaning head has a cleaning liquid jet in the area of the vacuum opening and the supply of cleaning liquid to the liquid jet is controlled, and devices are provided that position the vacuum opening adjacent to a contamination on a slaughtered animal body in order to remove the contamination therefrom without the slaughtered animal carcass cleaning head getting stuck by suction on the surface of the slaughtered animal carcass. In this connection, a water-containing cleaning liquid at a temperature of at least 72° C. is to be used.

This idea hardly solves the problems; because work is done with a lot of hot water by hand, even more surface water is to be expected in the dripping stretch. This aside, manual removal by suction of the liquid that moreover is undesirably loaded with chemicals is complex and inhibits a high throughput speed.

For keeping constant the temperature and atmospheric conditions in poultry breeding, the publication DE 38 40 782 A1 discloses an incubator with air flow control devices in order to control flow of fresh external air into the incubator and in order to control the air in the interior of the incubator; air conditioning adjustors in order to heat, humidify and recirculate the air in the incubator; as well as control or regulating devices for the air conditioning adjustors in order to monitor the temperature level, the moisture level, and the air circulation in the chamber and in order to control or regulate the air conditioning adjustors and the air flow control devices in such a way that temperature and moisture are maintained at predetermined levels and a predetermined air circulation is maintained. It is not disclosed whether this device is also used in slaughterhouses.

The publication DE 8903228 U1 discloses a fan, preferably a wall fan whose fan wheel is arranged in a housing provided with an air inlet and an air outlet that has a pollen filter through which the air that is conveyed by the fan wheel can pass. It is not disclosed whether such filters are effective also in case of pathogenic germs.

SUMMARY OF THE INVENTION

Therefore, it is an object of the invention to provide a method and a device with which the germ growth of the slaughtered animal carcass is curtailed and a falsification of the slaughter weight is reduced.

The problem is solved with respect to the method in that horizontally guided processed air is guided about the carcasses at speeds of 1.5 to 6 m/s with a suction effect in a separate room and is solved with respect to the device in that the suspension conveyer is guidable in a meander shape in parallel tracks transversely to the horizontally oriented suction openings and inlet openings for air and the inlet and suction openings are connected by means of an air conditioning device arranged outside of the room for dehumidifying and cooling of the air removed by suction from the room. The invention is further directed to the use of a room embodied as a dripping stretch in a slaughterhouse by installation or attachment of inlet and suction openings on two oppositely positioned enclosure walls that are arranged substantially transversely to the entryway and exit for the carcasses and coupling of the openings with an air conditioning device for generating a horizontally oriented air flow transversely to slaughtered animal carcasses transported in suspension through the room. Further embodiments of the invention are disclosed in the dependent claims.

The solution effects first of all hygienic improvements. As a result of the pretreatment as described above, after killing and evisceration, the slaughtered animal carcasses have body temperature, or even an increased body temperature, and are at least surface-wet in a so-called dripping stretch. The slaughtered animal carcasses are thus exposed to an increased germ growth as long as they are not subjected to immediate cooling because the number of germs will double within 20 min.

Slaughtered animal carcasses in the following are to be understood as: bodies of all animals suitable for slaughter, in particular cattle, pigs, sheep, goats or poultry, but only the carcass without blood and viscera. For large animals, this can be also quarters or halves of a carcass. The invention will be described essentially in connection with handling of pig halves.

The time period between killing the animal/slaughtering and weighing and the subsequent immediate cooling, depending on national regulations for slaughtered animals, is as follows: after cutting open the animal, for example, maximally 45 min. in Germany and maximally 20 min. in The Netherlands. A further advantage of the invention resides in the improved acquisition of the real weight of the delivered carcass of the slaughtered animal.

National regulations regulate the point in time of weighing of the carcass of the slaughtered animal. The weight that is determined thereby is the basis for payment for the raw material to the supplier. This point in time is directly after the dripping stretch.

The supplier has the advantage and the slaughterhouse the disadvantage that a weight increase that cannot be influenced by either party is resulting from the pretreatment with warm or hot water. Surface water was added to the slaughtered animal carcass and the carcass has become even more susceptible for absorbing water as a result of heating.

For realizing the invention a few actions are taken and constructive changes of the slaughterhouse operation are proposed.

After completion of the slaughtering process the carcass, still warm after slaughter, passes suspended on a conveying chain through the dripping stretch for final bleeding and dripping-off of the water; this stretch should preferably be located in a separate room. This dripping stretch with regard to size is matched to the residence time defined by the regulations as well as also to the slaughter speed of the respective facility.

It is not permitted to chill the slaughtered animal carcass already prior to weighing; the carcasses should maintain approximately body temperature (37° C.+/− approximately 2K) because otherwise weight is lost (DD 232 641 A1).

After weighing the carcasses, still warm after slaughter, are subjected to the conventional chilling process. The cooling chambers are furnished with conventional humidifying devices in order to minimize thus the loss that occurs by cooling up to the point of reaching the legally prescribed core temperature of +7° C. In this connection, no bacteriological disadvantages result.

The technical configuration to be described later on is based on a slaughter speed of 270 pigs/hour with a performance reserve of approximately 30%.

Hygienic Problems in the Dripping Stretch

The microorganisms that may cause diseases multiply in or on the food. Microorganisms that include the pathogens causing food poisoning are microorganisms that cannot be recognized with the naked eye. Microorganisms are omnipresent in nature: they are existing in the air, in water, in the soil, on the surface of the skin and the mucous membranes of humans and animals. Microorganisms include bacteria, yeasts and molds but also viruses.

Raw food can already be contaminated with microorganisms, also with pathogenic germs, when being produced, i.e. upon slaughter. These pathogens or disease-causing germs can be spread and transmitted even when such processing is done in the generally accepted way.

A direct spreading of germs happens, for example, when food is contacted with dirty hands, primarily in case of infected wounds, by coughing or sneezing as well as in case of lack of bodily or clothing hygiene.

Microorganisms are also indirectly spread when working spaces and working devices are designed such that they are difficult to clean or can be cleaned only inadequately.

Microorganisms multiply by division. Under favorable conditions a microorganism can divide once in 20 minutes. However, only under conditions that are favorable for the microorganisms such as temperature of the food, its water contents, its acid level and based on the nutrients that are contained in the food.

Most pathogens multiply best within an average temperature range between 10° C. and 35° C. i.e., also on animals that have just been slaughtered and are still warm. The longer a food is stored at such average temperatures between 20° C. and 35° C., the more the germs will multiply. Favorable for the multiplication of microorganisms are foods that contain many nutrients, for example, high water contents and protein, that is e.g. meat. Important for the life of microorganisms is water because the nutrients are dissolved and transported in it. However, it is not decisive how much water in total is contained in the food but how much of this water is freely accessible, favorably at least 15% water. Of great importance for multiplication of microorganisms, in addition to temperature, water contents, level of acid, and available nutrients, is also the structure of the food. In case of raw meat the germ-loaded surface contacts the low germ count interior of the meat in which nutrients and water are released so that bacteria can multiply well.

The number of microorganisms that are on or in the various foods differ greatly. In case of fresh meat, for example, several thousand up to several million bacteria per square centimeter can be found without the meat being spoiled.

Normal germ contents in case of pork as a total viable count (colony-forming units per unit) per square centimeter (TVC CFU) are:

| | |
|---|---|
| pork (fresh) | 1,000,000 (5log CFU) |
| pork (aged) | 100,000,000 (8log CFU) |

In the future, these germ counts are no longer acceptable at the production facilities. The decision 2001/471/EC of the EU Commission of 8 Jun. 2001 regarding "Rules for the regular checks on the general hygiene carried out by the operators in establishments according to Directive 64/433/EEC on health conditions for the production and marketing of fresh meat" forces the operators of slaughtering and meat packing facilities to control the production conditions in the facility to ensure compliance with general hygiene standards based on regular tests carried out according to the seven principles of the HACCP system.

This decision prescribes for carcasses of slaughtered animals the control of cleaning and disinfection, authorized sample removal methods, frequency, number, point in time, surface, method and, for carcasses of slaughtered animals, the localizations of the samples to be taken and sets rules for performing microbiological tests as well as for recording, analyzing and evaluating the results of in-house controls in order to ensure a uniform control of implementation.

The daily average $\log_{10}$ values are to be divided into categories "acceptable", "critical", and "unacceptable". The EU decision defines, for example, limits for the listed categories (Table 1) in the regulation (EU) No. 2073/2005 of the Commission dated 15 Nov. 2005 in regard to microbiological criteria for foods (Official Journal No. 338 of 22 Dec. 2005, pages 0001-0026).

TABLE 1

Evaluation criteria for sorting the results (daily average $\log_{10}$ values; total viable count; Enterobacteriaceae) of cattle and pig carcasses with destructive sample taking into categories "acceptable", "critical" and "unacceptable"

| | acceptable range ($\log_{10}$ CFU/cm$^2$) | | critical range ($\log_{10}$ CFU/cm$^2$) | | unacceptable range ($\log_{10}$ CFU/cm$^2$) | |
|---|---|---|---|---|---|---|
| | cattle | pigs | cattle | pigs | cattle | pigs |
| total viable count | <3.5 | <4.0 | 3.5-5.0 | 4.0-5.0 | >5.0 | >5.0 |
| Enterobacteriaceae | <1.5 | <2.0 | 1.5-2.5 | 2.0-3.0 | >2.5 | >3.0 |

*Values also valid for horse, sheep and goat carcasses

Environmental Problems in the Slaughterhouse

Under the subject heading "Best Process Technology" BPT of the DE government in the Internet on 12 Aug. 2007 at 21:57:23 hours, the following was available for reading:

The use of energy for heating water is also a . . . significant environmental problem in slaughterhouses. For generating hot water, primarily oil and/or natural gas is used. Boiler water is usually softened before use. The regulation for use of hot water is divided onto tubs and showers, pig scalding tanks (58-65° C.), spraying devices (60-65° C.) and sterilization baths (>82° C.). (57, DoE, 1993).

An environmentally friendly resource use is encompassed in EN ISO 14001:1996 and the EU Environmental Audit System (EMAS). This system is used in several IPPC facilities (facilities in accordance with the directive 96/61/EC for the integrated environmental pollution prevention and control) and should be aspired at any facility; for slaughterhouses it is currently not legally required.

The invention wants to realize for the first time the principle with the desired improvements in the processing of hot water and air filtration.

The first solution with the method according to the invention for treatment of carcasses of slaughtered animals by means of an air flow during the suspended transport after evisceration and prior to weighing in a slaughterhouse provides that horizontally guided processed air is guided about the carcasses at speeds of 1.5 to 6 m/s with a suction effect in a separate room, which in general is available today as a so-called dripping stretch.

In this connection, an air exchange in the room of 1-3 times per minute is desired. On the other hand, the flow speed may not be so high that solids are sucked away from the ground.

During this treatment, the carcasses are guided in a dripping stretch of the slaughterhouse in a meander shape in a plurality of rows past air inlet and air outlet openings so that they are exposed several times to the air flow.

In a further embodiment of the invention, the air openings are opened to approximately 60% to 100% of the stretched length of the carcasses and are designed optimally for a flow of air about the carcasses.

The air removed by suction is filtered, dehumidified and cooled as in a device that is designed for living spaces before it is supplied again to the air inlet openings. The air removed by suction is used for heating, by heat exchangers, processing water of the slaughterhouse, for example, for cleaning the slaughtered animals. In this way, the requirement for an environmentally sound production is complied with.

The method according to the invention further provides that the sucked-off air is passed through filters for filtering out pathogenic germs that typically colonize on fresh meat and/or in the aerosol and/or the air in the dripping zone. In practice, with the method and an adapted facility a germ count TVC of less that 100 per cm$^2$ (2 log CFU) can be achieved, i.e., optimal in the meaning of the regulations of the EU.

For optimizing the method, the temperature of the carcasses and/or their environmental temperature at a supply opening of the dripping stretch for such carcasses is to be detected, optionally stored and compared to a same type of temperature at the discharge opening of the dripping stretch and the difference is to be used as a parameter for processing the air. The carcasses may not be cooled down prior to weighing; legal regulations do not permit this.

Therefore, the air speed at the suction side is controlled such that between air inlet and air outlet maximally a temperature increase of the air of 2 to 15 Kelvin occurs. In this way, cooling of the carcass is reliably prevented. It has been found to be advantageous that the temperature of the sucked-off air is processed such that at the air inlet side into the room it is at least 12° C., preferably 14 to 16° C.

The second solution according to the invention comprises a device for treatment of carcasses of slaughtered animals transported by means of a suspension conveyer in a separate room in a slaughterhouse, after evisceration and prior to weighing. The suspension conveyor extends in a meander shape in parallel tracks transverse to horizontally oriented suction openings and inlet openings for air. The inlet and suction openings are connected by an air conditioning device disposed outside of the room for dehumidification and cooling of the air removed by suction from the room.

Preferably, the inlet openings and suction openings are installed in the walls of the room. Alternatively, in case of thin walls, it can be provided that the devices with the openings are mounted on the wall and the adjoining air passages are passed through the roof or the floor of the room or laterally to the air conditioning device.

In case of a new construction, the dripping zone can also be assembled from pre-fabricated parts or can be designed as a container that has only a typical wall thickness of less than 100 mm and that is insulated. It has an entryway for the supply of the slaughtered animal carcasses and an appropriate exit. The typically employed suspension conveyers for the slaughtered animal carcasses, which may be entire carcasses or halves (pigs) or quarters (cattle), are in general mounted on the ceiling or a separate truss support structure. They have hooks or other load carrying means, known in general, for suspended transport of the slaughter goods.

For a laminar flow, the openings are provided with horizontally oriented or orientable slats for dividing an air flow. The air can then pass at a suitable height through the slaughter goods and can flow closely about the carcasses.

The suction openings are furnished with economic fans with a one-side suction configuration whose fan wheel blades—with high efficiency—are curved backwards. The fans have on the fan wheel axle directly driven electric motors. Therefore, V-belts that soil easily or similar devices are not required.

Processing of the air is provided by an air conditioning device. It is a separate closed system embodied in one or several containers and can be placed in the vicinity of the room/dripping stretch and, by means of air supply conduits extending to the to the inlet and suction openings, is connectable in a simple way. This effects a high degree of prefabrication of the device so that a person of skill in the art in a few days can retrofit already existing slaughterhouses or can even install a new dripping stretch by means of containers.

The dripping stretch has as a separate room at least one entryway and an exit for the carcasses. The room is to be furnished according to the invention with sensors for determining the most important parameters of the air, at least however its temperature and humidity. The sensors detect the parameters and pass them on, converted in accordance with signaling technology, to the air conditioning device.

The air conditioning device has a control or regulating device for treating the air that can receive signals from the sensors in the room. In this way, it is continuously checked what the temperature in the environment of the carcasses is and whether the air must be conditioned differently or should even be interrupted in case of stop or slow-down of slaughtering.

The inlet and suction openings have a height that matches approximately the length of the trunk of the carcasses and a width that is greater than the expected width of the carcass suspended from the suspension conveyor. In practice, the best results were obtained in this way.

According to the invention, also an already existing dripping stretch in a slaughterhouse can be used when the existing room by installation of inlet and suction openings on two oppositely positioned circumferential walls that are arranged transverse to the entryway and exit of the carcasses; then, coupling of the openings with an air conditioning device for generating a horizontally oriented air flow transverse to the slaughtered animal carcasses transported suspended through the room must be realized.

The inlet and suction openings should be arranged directly opposite each other for an optimal flow of the air.

Based on a schematic drawing the invention will be explained in more detail with regard to its spatial arrangement.

BRIEF DESCRIPTION OF THE DRAWING

The only FIGURE shows a dripping stretch according to the invention for a slaughterhouse with entryway in one wall and an exit at another wall where the carcasses exit to be weighed and air inlet and outlet openings at opposite walls.

DESCRIPTION OF PREFERRED EMBODIMENTS

The FIGURE shows a dripping stretch 1 with entryway E in the wall WE of the preceding slaughterhouse stretch 2 and the exit A in the wall WA to the scale 3 and to the cold store, not illustrated. The entryway E can be closed by door 8, the exit A can be closed by door 9, for example, in idle periods or for separating the dripping stretch when slaughtering is stopped or slowed down. Between entryway E and exit A, an over-head suspension conveyor, known in general, extends with meandering tracks S1, S2, S3, S4 to S11.

On the suspension conveyor S1-S11 numerous pig halves or slaughtered animal carcasses K can be seen that are transported by the suspension conveyor in loops through the room for final bleeding and dripping off of excess water.

In the walls W5 and W6 there are inlet openings 5 and suction openings 6 that are provided with fans (not shown); 5 each per wall with each having approximately 1 m$^2$ of total opening size that however can also be only partially opened by means of horizontally extending slats. When not in use, the openings 5, 6 can be closed by doors, not shown. The horizontal slats direct an air flow LE from the inlet openings 5 horizontally to the suction openings 6 as soon as the fans are switched on.

The removed air flow LA is loaded also with germs and aerosols because of the humidity in the room of up to 95% and a radiation emitted by the slaughter goods at body temperature. The air flow LA is conveyed through the openings 6 directly to the air conditioning device 7 that is housed in a separate housing such as a container 4, is regenerated therein, and is returned to the inlet openings. The heat is preferably transferred by means of heat exchangers to a water supply, not shown, for cleaning the animals/carcasses in front of the dripping stretch 1.

The arrows LE and LA indicate the flow about the carcasses K of which only a few are illustrated. In practice, the entire meandering suspension conveyor S1-S11 is loaded with pig halves K; they are thus suspended in a relatively tight arrangement.

The flow behavior enables that surface water from the pig halves illustrated here is almost completely removed by the air LA with appropriate frequency of air exchange. The practical residence time in the room 1 is approximately 20 minutes, the throughput in the room 1 approximately 270 carcasses per hour. The volume flow of the air conditioning device 7 is approximately 43,000 m$^3$/h; the most beneficial air speed LE, LA was in practice approximately 2-3 m/s for a pressure drop of approximately 400 pa.

In the vicinity of the sliding door 8 or hinged door 9 for closing the entryway E and the exit A, sensors, not shown, for control of the room temperature and humidity as well as for controlling the air conditioning device 7 are provided. In addition or as an alternative, other locations can be determined in accordance with the room situation and the slaughtering speed by a person of skill in the art. Such control devices are known to a person of skill in the art.

What is claimed is:

1. A method for treating carcasses of slaughtered animals during suspended transport after evisceration and prior to weighing in a slaughterhouse by means of an air flow, the method comprising:
    horizontally guiding processed air (LA, LE) about the carcasses (K) in an air flow at speeds of 1.5 to 6 m/s with a suction effect in a separate room (1).

2. The method according to claim 1, comprising the step of guiding the carcasses in a dripping stretch (1) of the slaughterhouse (2) several times through the air flow (LE, LA) in a meander shape in a plurality of rows (S1-S11) past air inlet openings and air outlet openings (5, 6).

3. The method according to claim 2, wherein the air openings are opened to approximately 60% to 100% of the stretched length of the carcasses (K) for providing the air flow (LE, LA) about the carcasses (K).

4. The method according to claim 2, comprising the steps of sucking away the air and filtering, dehumidifying and cooling the sucked-off air before the air is returned to the air inlet openings (5).

5. The method according to claim 4, wherein the sucked-off air (LA) is used for heating of processing water of the slaughterhouse (2) by heat exchangers.

6. The method according to claim 4, wherein in the step of filtering the sucked-off air (LA) is passed through filters for filtering out pathogenic germs that typically colonize on fresh meat and/or are contained in the aerosols and/or the air in the dripping zone (1).

7. The method according to claim 2, comprising the steps of detecting, optionally storing, a first temperature of the carcasses (K) and/or a first temperature of the carcass environment in the vicinity of a supply opening (E) of the dripping stretch (1) and comparing the detected temperature with a second temperature of the carcasses (K) and/or a second temperature of the carcass environment in the vicinity of the exit opening (A) of the dripping stretch (1) and using a difference of the first and second temperatures of the carcasses and/or the carcass environment as a parameter for processing the air (LA).

8. The method according to claim 2, wherein the air speed at a suction side is controlled such that between the air inlet openings (5, LE) and the air outlet openings (6, LA) maximally a temperature increase of the air of 2 to 15 Kelvin occurs.

9. The method according to claim 4, wherein the temperature of the sucked-off air (LA) is processed such that the air, at the air inlet openings is at least 12° C., preferably 14-16° C.

10. A device for treating carcasses of slaughtered animals transported by a suspension conveyer after evisceration and prior to weighing in a slaughterhouse in a separate room, wherein the separate room has horizontally oriented air inlet openings and horizontally oriented suction openings that remove air by suction and wherein the suspension conveyer extends in a meander shape in parallel tracks (S1-S11) transversely to the horizontally oriented suction openings (6) and inlet openings (5) for air, wherein an air conditioning device is provided and the inlet openings and the suction openings (5, 6) are connected to each other by the air conditioning device (7) arranged outside of the room (1) for-dehumidifying and cooling of the air (LA) removed through the suction openings by suction from the room (1).

11. The device according to claim 10, wherein the inlet openings and suction openings (5, 6) are provided on two oppositely positioned walls (W5, W6) of the room (1).

12. The device according to claim 10, wherein the inlet openings and the suction openings (5, 6) for dividing an air flow (LE, LA) are provided with horizontally extending slats.

13. The device according to claim 10, wherein the suction openings (6) are provided with fans of a one-side suction configuration, wherein the fans have fan wheel blades that are curved backwards.

14. The device according to claim 13, wherein the fans comprise directly driven electric motors mounted on a fan wheel axle of the fans.

15. The device according to claim 10, wherein the air conditioning device (7) is configured as a separate closed system in one or several containers (4) placed in the vicinity of the room (1) and connected by air conduits to the inlet openings and the suction openings (5, 6).

16. The device according to claim 10, wherein the room (1) at least in the vicinity of an entryway (E) and an exit (A) for the carcasses (K) is furnished with sensors for detecting at least temperature and humidity of the air as parameters of the air (LE, LA) and the sensors signal the detected parameters to the air conditioning device (7).

17. The device according to claim 16, wherein the air conditioning device (7) comprises a control or regulating device that receives signals from the sensors in the room (1).

18. The device according to claim 10, wherein the inlet openings and the suction openings (5, 6) have a height that corresponds approximately to a length of a trunk of the carcasses (K) and have a width that is greater than an expected width of the carcasses suspended from the suspension conveyer.

19. A method of using a room (1) embodied as a dripping stretch in a slaughterhouse (2) by installing or attaching inlet and suction openings (5, 6) on two oppositely positioned enclosure walls (W5, W6) of the room that are arranged substantially transversely to the entryway (E)/exit (A) for the carcasses (K) and coupling of the openings (5, 6) with an air conditioning device (7) for generating a horizontally oriented air flow (LE, LA) transversely to slaughtered animal carcasses (K) transported in suspension through the room (1).

20. The method according to claim 19, comprising the step of arranging the inlet and suction openings (5, 6) opposite each other.

* * * * *